(12) United States Patent
Falco

(10) Patent No.: US 11,737,589 B2
(45) Date of Patent: Aug. 29, 2023

(54) CHECKOUT CONVEYOR SYSTEM FOR VISUALLY SEPARATING ITEMS

(71) Applicant: Jonathan Falco, Homestead, FL (US)

(72) Inventor: Jonathan Falco, Homestead, FL (US)

( * ) Notice: Subject to any disclaimer, the term of this patent is extended or adjusted under 35 U.S.C. 154(b) by 161 days.

(21) Appl. No.: 17/537,933

(22) Filed: Nov. 30, 2021

(65) Prior Publication Data
US 2023/0165390 A1 Jun. 1, 2023

(51) Int. Cl.
*A47F 9/04* (2006.01)

(52) U.S. Cl.
CPC .......... *A47F 9/04* (2013.01); *A47F 2009/041* (2013.01); *B65G 2203/0233* (2013.01); *B65G 2203/042* (2013.01)

(58) Field of Classification Search
CPC ................ A47F 9/04; A47F 2009/041; B65G 2203/0233; B65G 2203/042
USPC ...................................................... 340/815.4
See application file for complete search history.

(56) References Cited

U.S. PATENT DOCUMENTS

| | | | |
|---|---|---|---|
| 5,450,926 A * | 9/1995 | Fraser | A47F 13/00 186/59 |
| 5,933,994 A | 8/1999 | Misaresh | |
| 6,991,166 B2 | 1/2006 | Tsikos | |
| 8,474,164 B2 * | 7/2013 | Spiro | G09F 23/06 40/454 |
| 8,783,438 B2 | 7/2014 | Phan | |
| 9,595,029 B1 * | 3/2017 | Catoe | G07G 1/0036 |
| 2003/0233775 A1 | 12/2003 | Klopfer | |

FOREIGN PATENT DOCUMENTS

| | | | | |
|---|---|---|---|---|
| KR | 101644610 B1 * | 5/2015 | ............. | B65G 15/00 |
| WO | WO-2021204692 A1 * | 10/2021 | ........... | G07G 1/0018 |

* cited by examiner

*Primary Examiner* — Eric Blount

(57) ABSTRACT

A checkout conveyor system for visually separating items is an apparatus that automatically projects a light as a divider. The apparatus includes a first rail, a second rail, a plurality of first illumination devices, a motion sensor, a plurality of first proximity sensors, a plurality of second proximity sensors, at least one microcontroller, and at least one power source. The first rail upholds and positions the plurality of first illumination devices and the plurality of first proximity sensors along a checkout system of the apparatus. The plurality of first illumination devices projects a line across a space between groups of items detected by the plurality of first proximity sensors and the plurality of second proximity sensors. The motion sensor activates the line. The at least one microcontroller manages the inputs and outputs. The at least one power source supplies the necessary power.

15 Claims, 11 Drawing Sheets

CHECKOUT CONVEYOR SYSTEM FOR VISUALLY SEPARATING ITEMS

FIELD OF THE INVENTION

The present invention generally relates to retail checkout systems. More specifically, the present invention is a checkout conveyor system for visually separating items.

BACKGROUND OF THE INVENTION

Checking out at a retail store with checkout conveyor belts typically means that customers are purchasing multiple items that need to be placed on the checkout conveyor belt for a cashier. The items placed on the checkout conveyor belt are quickly placed on the checkout conveyor belt as customers are rushing to checkout and exit the store. Although checkout dividers are available for customers to position before and after their respective items, checkout dividers are either not used at all or incorrectly placed. At times, one customer uses the checkout divider, and the following customer forgets or chooses not to use the checkout divider causing confusion for the cashier. When checkout dividers are used, germs are quickly spread between each customer touching the checkout dividers, the checkout dividers resting on the conveyor belt, and the cashier touching the checkout dividers.

It is an objective of the present invention to facilitate the division of groups of items for a checkout conveyor system while reducing the touching and steps required to identify different groups of items. The present invention automatically and visually alerts customers and cashiers of different groups of items. The present invention projects a light between different groups of items and requires only the motion of a hand to activate. The light disappears once the corresponding group of items has reached the end of the conveyor belt and removed from the conveyor belt.

DETAILED DESCRIPTIONS OF THE INVENTION

Figure 1:
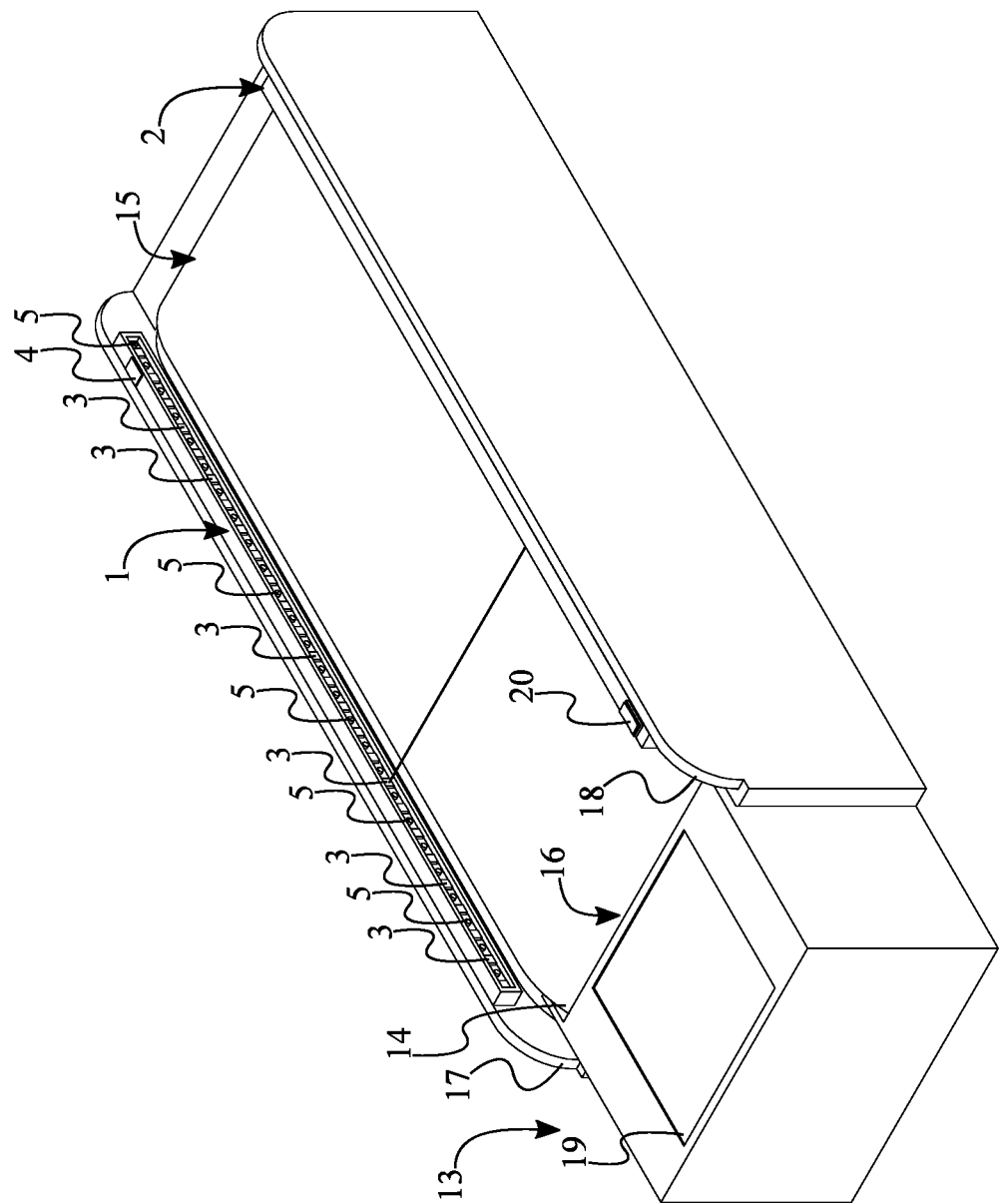
FIG. 1 is a front perspective view of the present invention with a plurality of first proximity sensors and a plurality of first illumination devices along a first rail.

All illustrations of the drawings are for the purpose of describing selected versions of the present invention and are not intended to limit the scope of the present invention.

The present invention is a checkout conveyor system for visually separating items. The present invention automatically detects the difference between groups of items on a checkout conveyor system and visually alerts customers and cashiers of the different groups of items. The present invention reduces any confusion of which groups of items belongs to which customer in line for checkout. The present invention also reduces the transmission of germs between customers and cashiers as no physical barrier is interchanged between different groups of items. In order for the present invention to detect the separation between different groups of items, the present invention comprises a first rail 1, a second rail 2, a plurality of first illumination devices 3, a motion sensor 4, a plurality of first proximity sensors 5, a plurality of second proximity sensors 6, at least one microcontroller 7, and at least one power source 10, seen in FIG. 1 and FIG. 2. The first rail 1 and the second rail 2 mount the plurality of first illumination devices 3, the motion sensor 4, the plurality of first proximity sensors 5, the plurality of second proximity sensors 6, at least one microcontroller 7, and the at least one power source 10 along a checkout conveyor system. More specifically, the first rail 1 positions and secures the plurality of first illumination devices 3 and the plurality of first proximity sensors 5. Likewise, the second rail 2 positions and secures the plurality of second proximity sensors 6. The plurality of first illumination devices 3 emits a line from the first rail 1 to the second rail 2, wherein the line is between different groups of items. The plurality of first illumination devices 3 is preferably a light emitting diode (LED) array. However, in alternate embodiments of the present invention, the plurality of first illumination devices 3 may be a variety of illumination devices comparable to an LED array. The plurality of first proximity sensors 5 and the plurality of second proximity sensors 6 identifies the spaces between different groups of items, wherein the spaces extend from the first rail 1 to the second rail 2. The plurality of first proximity sensors 5 and the plurality of second proximity sensors 6 are not limited to a single type of proximity sensor. The motion sensor 4 activates the plurality of first illumination devices 3, the plurality of first proximity sensors 5, and the plurality of second proximity sensors 6. Moreover, the projected lines by the plurality of first illumination devices 3 are activated by the plurality of first proximity sensors 5 and the plurality of second proximity sensors 6. More specifically, multiple lines may be projected by adjacent illumination devices of the plurality of first illumination devices 3 in order to distinguish more than two groups of items. The at least one microcontroller 7 receives inputs from the plurality of first proximity sensors 5 and the plurality of second proximity sensors 6 and processes outputs with the plurality of first illumination devices 3. The at least one power source 10 supplies the plurality of first illumination devices 3, the plurality of first proximity sensors 5, the plurality of second proximity sensors 6, and the at least one microcontroller 7 with the necessary power to operate. The at least one power source 10 may be a portable and replaceable battery as well as an external power source such as an outlet.

The overall configuration of the aforementioned components allows the present invention to automatically display a divider between grouped items along a checkout conveyor system. In order for groups of items to be positioned in between the first rail 1 and the second rail 2, the first rail 1 and the second rail 2 are mounted parallel and offset from each other, seen in FIG. 1 and FIG. 2. The plurality of first illumination devices 3 and the plurality of first proximity sensors 5 are mounted along the first rail 1, thereby upholding the plurality of first illumination device and the plurality of first proximity sensors 5 along a checkout conveyor system. At least one projected line extends from the first rail 1 to the second rail 2 between different groups of items as the plurality of first illumination devices 3 and the plurality of first proximity sensors 5 are oriented towards the second rail 2. In order for the motion sensor 4 to detect the movement of a hand of the user, the motion sensor 4 is externally mounted to the first rail 1. In order to provide a continuous line from the plurality of first illumination devices 3 the plurality of second proximity sensors 6 is mounted along the second rail 2. Moreover, the plurality of second proximity sensors 6 is oriented towards the first rail 1 in order to be able to simultaneously detect the different groups of items and the space between the different groups of items with the plurality of first proximity sensors 5. More specifically, the motion sensor 4 is preferably integrated into the first rail 1 and is enclosed by a transparent cover or window. The activation of the plurality of first proximity sensors 5 and the plurality of second proximity sensors 6 by the motion sensor 4, which in turn activates the plurality of first illumination devices 3 is processed as the plurality of first illumination devices 3, the motion sensor 4, the plurality of first proximity sensors 5, the plurality of second proximity sensors 6, and the at least one power source 10 are electronically connected with the at least one microcontroller 7. The plurality of first illumination devices 3, the motion sensor 4, the plurality of first proximity sensors 5, and the plurality of second proximity sensors 6 are electrically connected with the at least one power source 10, thereby directly providing the plurality of first illumination devices 3, the motion sensor 4, the plurality of first proximity sensors 5, and the plurality of second proximity sensors 6 with the necessary power to operate.

The present invention preferably further comprises a checkout system 13 which upholds and transports different groups of items to a cashier along a line of customers, seen in FIG. 1, FIG. 2, FIG. 3, FIG. 4, and FIG. 5. In order for different groups of items to be delivered to a cashier, the checkout system 13 may comprise a conveyor belt 14, a first elongated barrier 17, and a second elongated barrier 18. The conveyor belt 14 slides the different groups of items alongside a line of customers. The different groups of items rest on the conveyor belt 14 as the customers move along the line for checking out at a retail store. The first elongated barrier 17 and the second elongated barrier 18 prevent items from readily falling off the conveyor belt 14, as well as prevent the conveyor belt 14 from getting jammed. The first elongated barrier 17 is preferably positioned beside the checkout line of customers, and the second elongated barrier 18 is preferably positioned beside a wall or a shelf of for-sale items such as candy or magazines. A width of the conveyor belt 14 is defined as the first elongated barrier 17 and the second elongated barrier 18 are positioned parallel and offset from each other. Moreover, the conveyor belt 14 is mounted in between the first elongated barrier 17 and the second elongated barrier 18, thereby defining a track for the different items towards the cashier. In order for the plurality of first proximity sensors 5 and the plurality of second proximity sensors 6 to identify spaces between different groups of items, the first rail 1 and the second rail 2 are positioned in between the first elongated barrier 17 and the second elongated barrier 18, and the first rail 1 and the second rail 2 are positioned adjacent to the conveyor belt 14. More specifically, the first rail 1 is connected adjacent and along the first elongated barrier 17. The first elongated barrier 17 does not inhibit the projected line from the plurality of first illumination devices 3 and the line is visible across the conveyor belt 14, as the plurality of first illumination devices 3 and the plurality of first proximity sensors 5 are positioned adjacent to the first rail 1, opposite the first elongated barrier 17. Similarly, the second rail 2 is connected adjacent and along the second elongated barrier 18. The plurality of second proximity sensors 6 is positioned adjacent to the second rail 2, opposite the second elongated barrier 18 so that the plurality of second proximity sensors 6 may detect the positioning of the different groups of items and, consequently the spaces between the different groups of items.

In the event the different groups of items are not properly placed onto the conveyor belt 14 by the customers, the present invention may further comprise a reset button 20, also seen in FIG. 1, FIG. 2, FIG. 3, FIG. 4, and FIG. 5. A cashier may activate the reset button 20 in order to accurately distinguish the different groups of items. In order for the cashier to identify the price of each item and total the total amount due by the customer, the checkout system 13 may further comprise a scanner 19. Furthermore, the conveyor belt 14 may comprise an input end 15 and an output end 16. The input end 15 is the furthest point of the conveyor belt 14 from the cashier that allows customer further down the checkout line to unload items for purchase. The output end 16 is the closest point of the conveyor belt 14 with the cashier that releases the items for purchase from the conveyor belt 14 for a cashier to manage. In order for the items to be immediately priced by the cashier, the scanner 19 is mounted adjacent with the output end 16. The motion sensor 4 is preferably positioned adjacent with the input end 15 so that the newest group of items added onto the conveyor belt 14 may be distinguished from the groups of items already placed on the conveyor belt 14. Moreover, the customer that corresponds with the newest group of items added onto the conveyor belt 14 may be easily reach the motion sensor 4. The motion sensor 4 is mounted adjacent to the first rail 1, opposite the conveyor belt 14, as the first rail 1 is positioned along the first elongated barrier 17. The reset button 20 is positioned adjacent with the output end 16 so that the cashier may readily access the reset button 20. The reset button 20 is preferably mounted onto the second rail 2, opposite the conveyor belt 14, as the cashier is positioned opposite the customer and beside the second elongated barrier 18. In order for the reset button 20 to reactivate the projected line, the reset button 20 is electronically connected to the at least one microcontroller 7.

Furthermore, once a proximal sensor of the plurality of first proximity sensors 5 and a corresponding proximal sensor of the plurality of second proximity sensors 6 detects the space between the different groups of items, the adjacent illumination device of the plurality of first illumination devices 3 are deactivated. The proximal sensor of the plurality of first proximity sensors 5 and the corresponding proximal sensor of the plurality of second proximity sensors 6 are terminally positioned with the first rail and the second rail, respectively. More specifically, the proximal sensor of the plurality of first proximity sensors 5 and the corresponding proximal sensor of the plurality of second proximity sensors 6 are positioned adjacent with the output end 16. Once the space has reached the output end 16, the light is no longer needed as the group of items has been completely removed from the conveyor belt 14 and scanned with the scanner 19.

Figure 2:
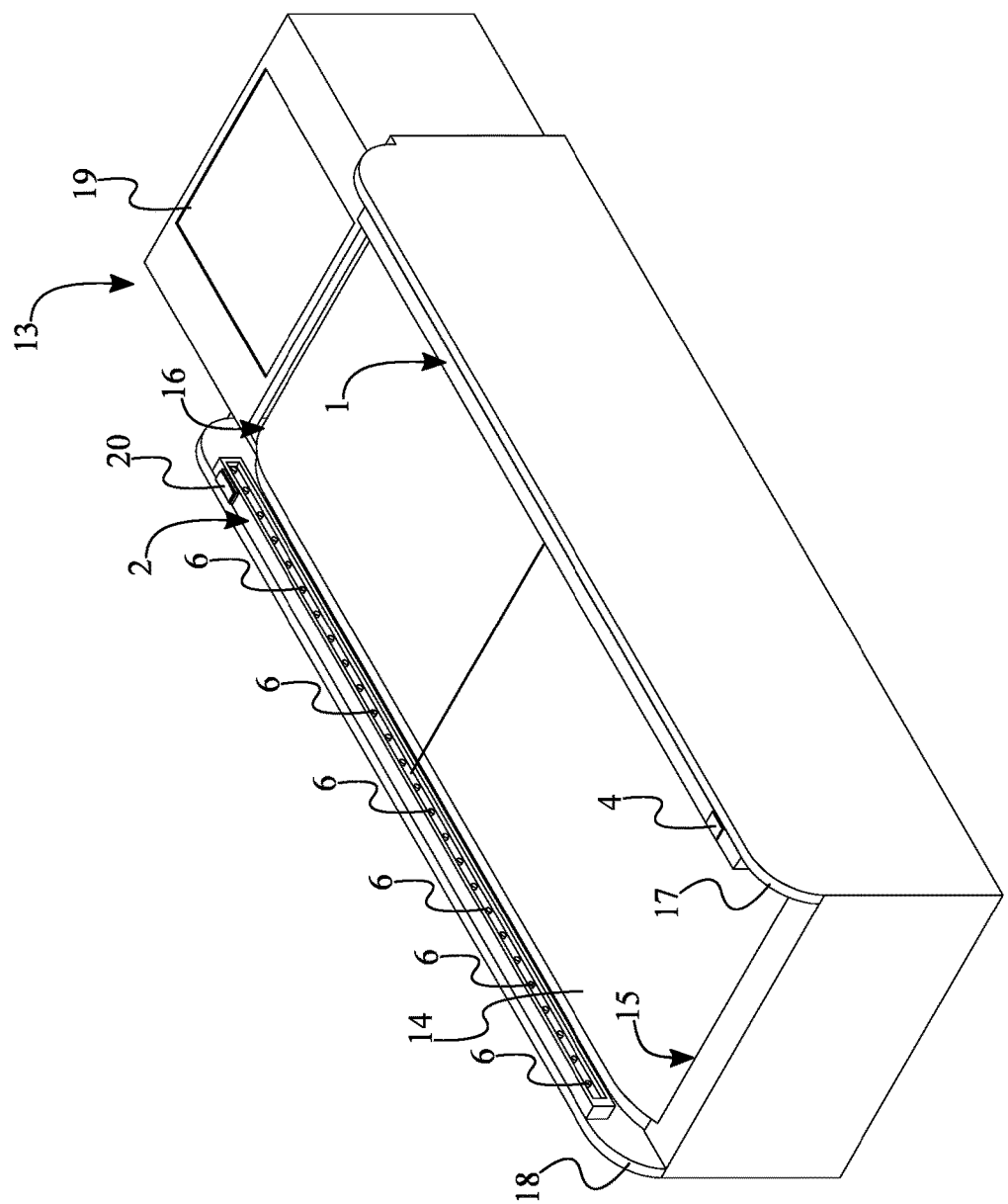
FIG. 2 is a rear perspective view of the present invention with a plurality of second proximity sensors along a second rail.
Figure 4:
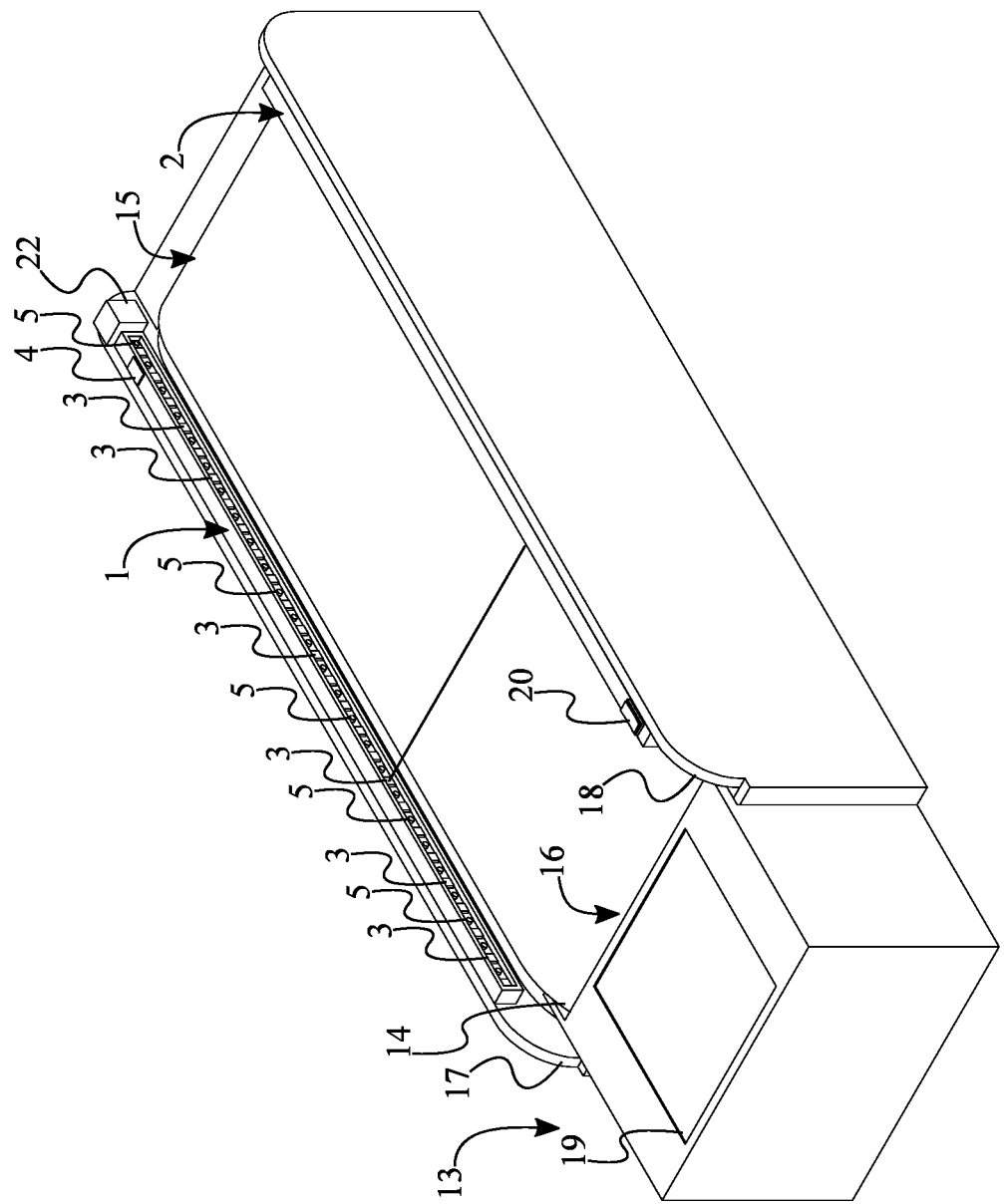
FIG. 4 is a front perspective view of the present invention with the plurality of first proximity sensors and the plurality of first illumination devices along the first rail and a controller box.
Figure 5:
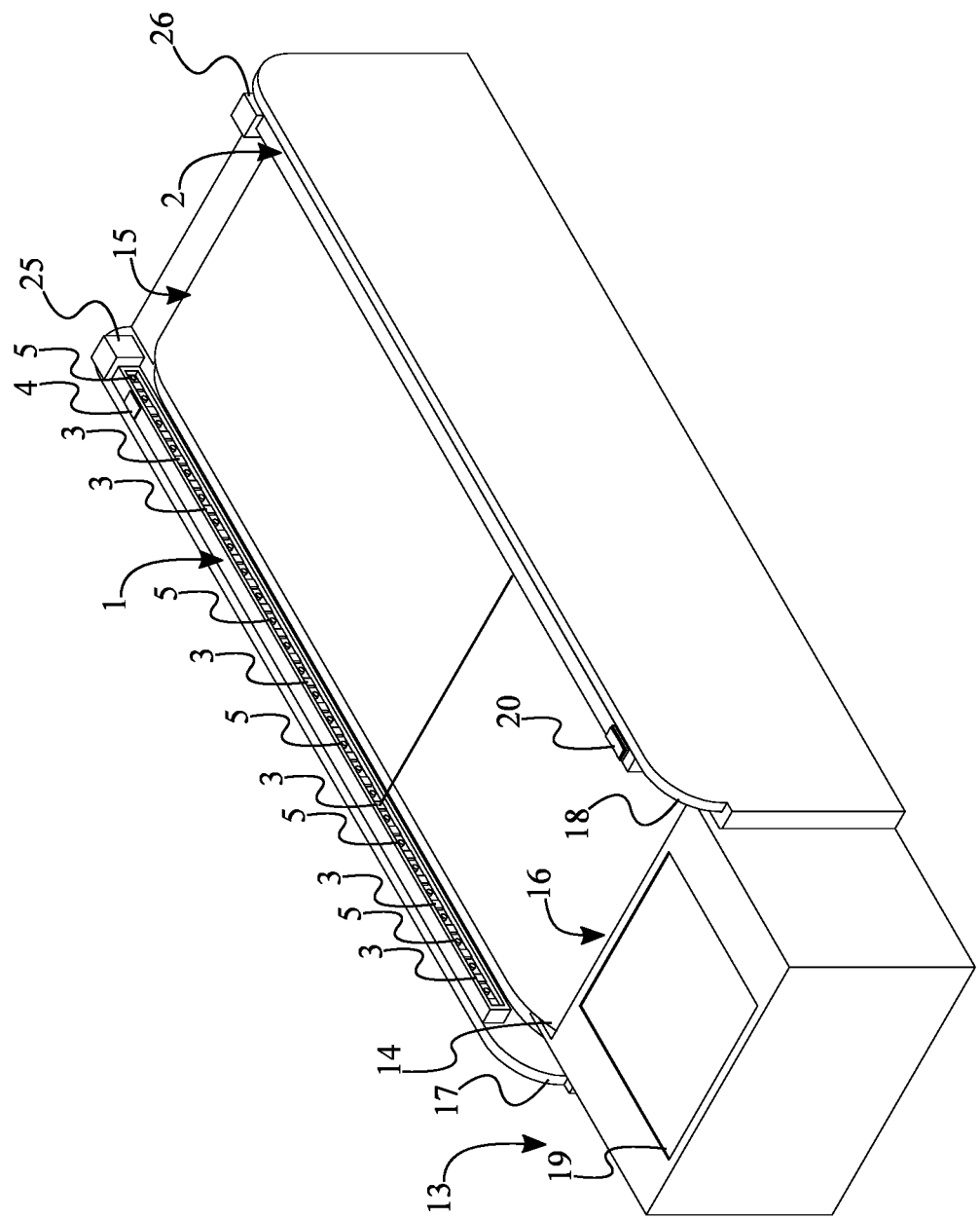
FIG. 5 is a front perspective view of the present invention with the plurality of first proximity sensors and the plurality of first illumination devices along the first rail, a first controller box, and a second controller box.
Figure 6:
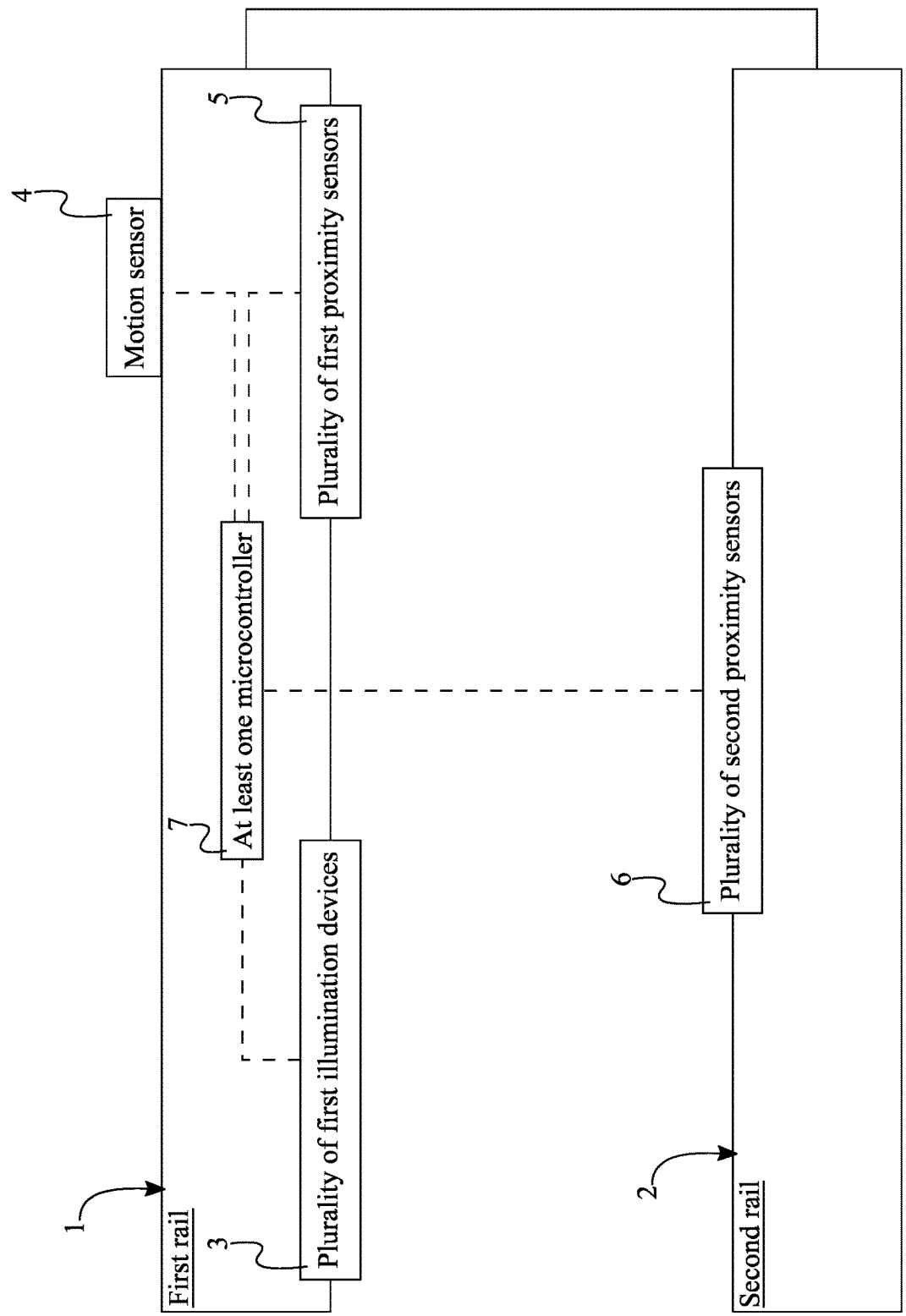
FIG. 6 is a schematic view of the electronic connections of the present invention with at least one microcontroller mounted within the first rail.
Figure 7:
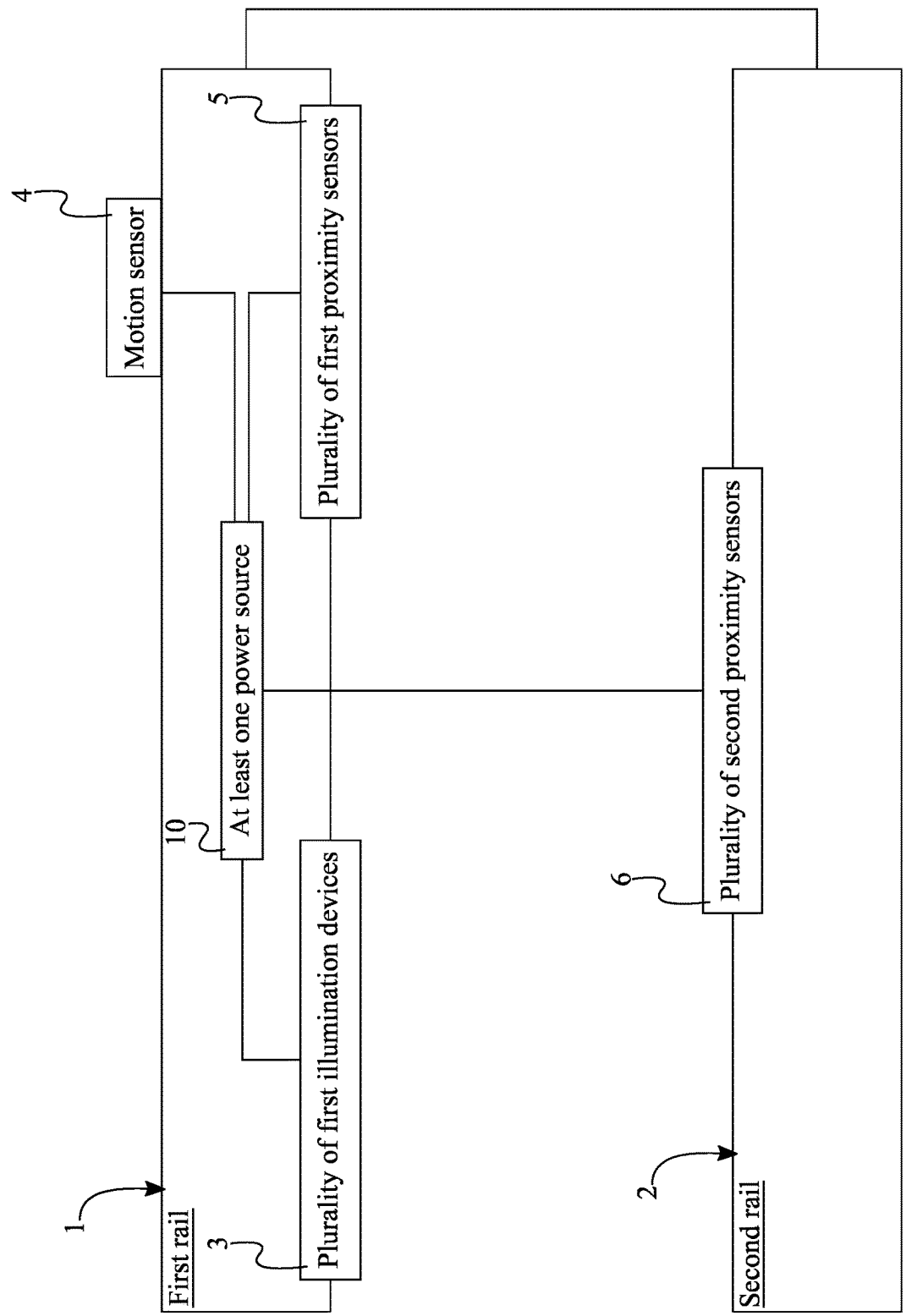
FIG. 7 is a schematic view of the electrical connections of the present invention with at least one power source mounted within the first rail.
Figure 8:
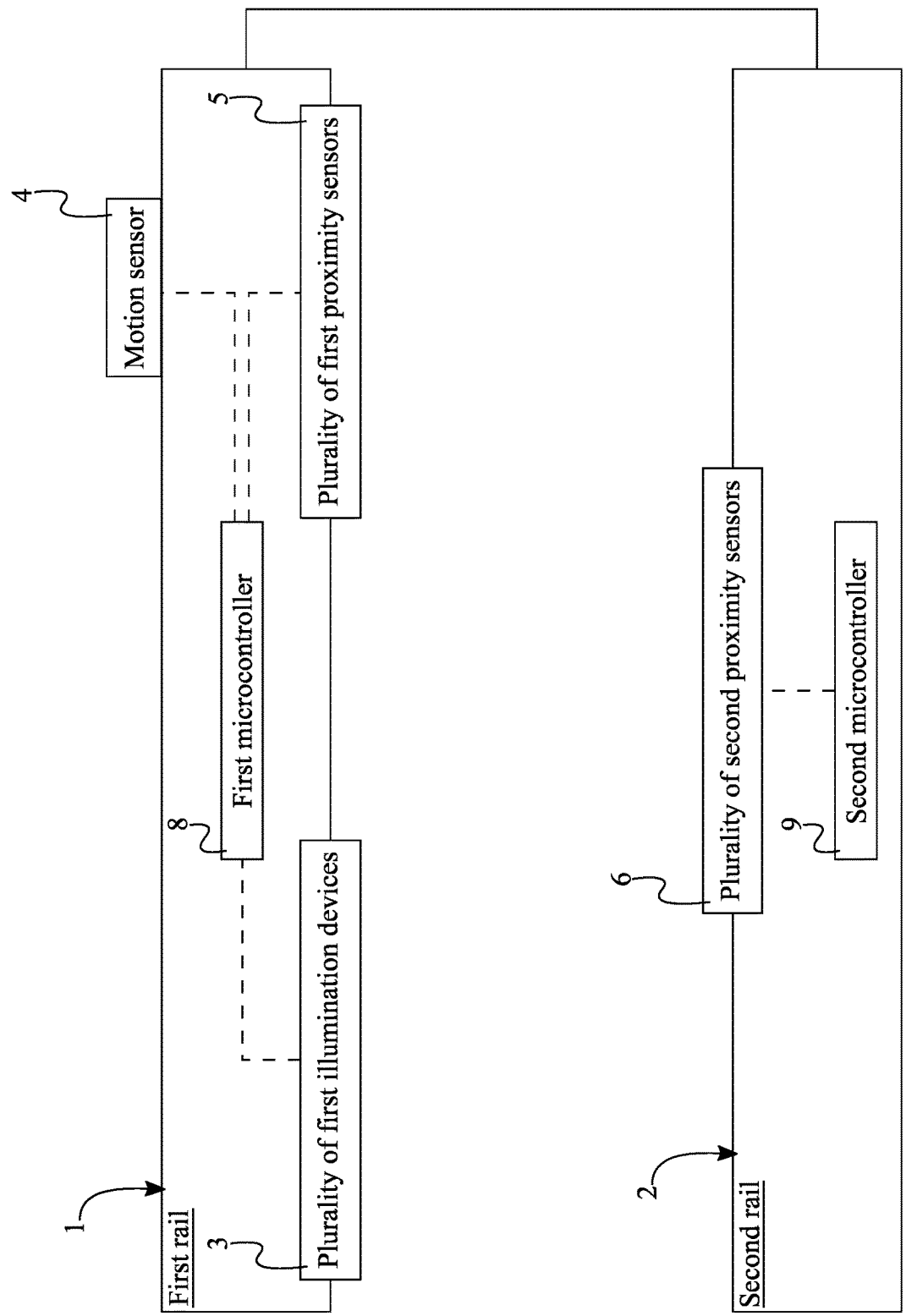
FIG. 8 is a schematic view of the electronic connections of the present invention with a first microcontroller mounted within the first rail and a second microcontroller mounted within the second rail.
Figure 9:
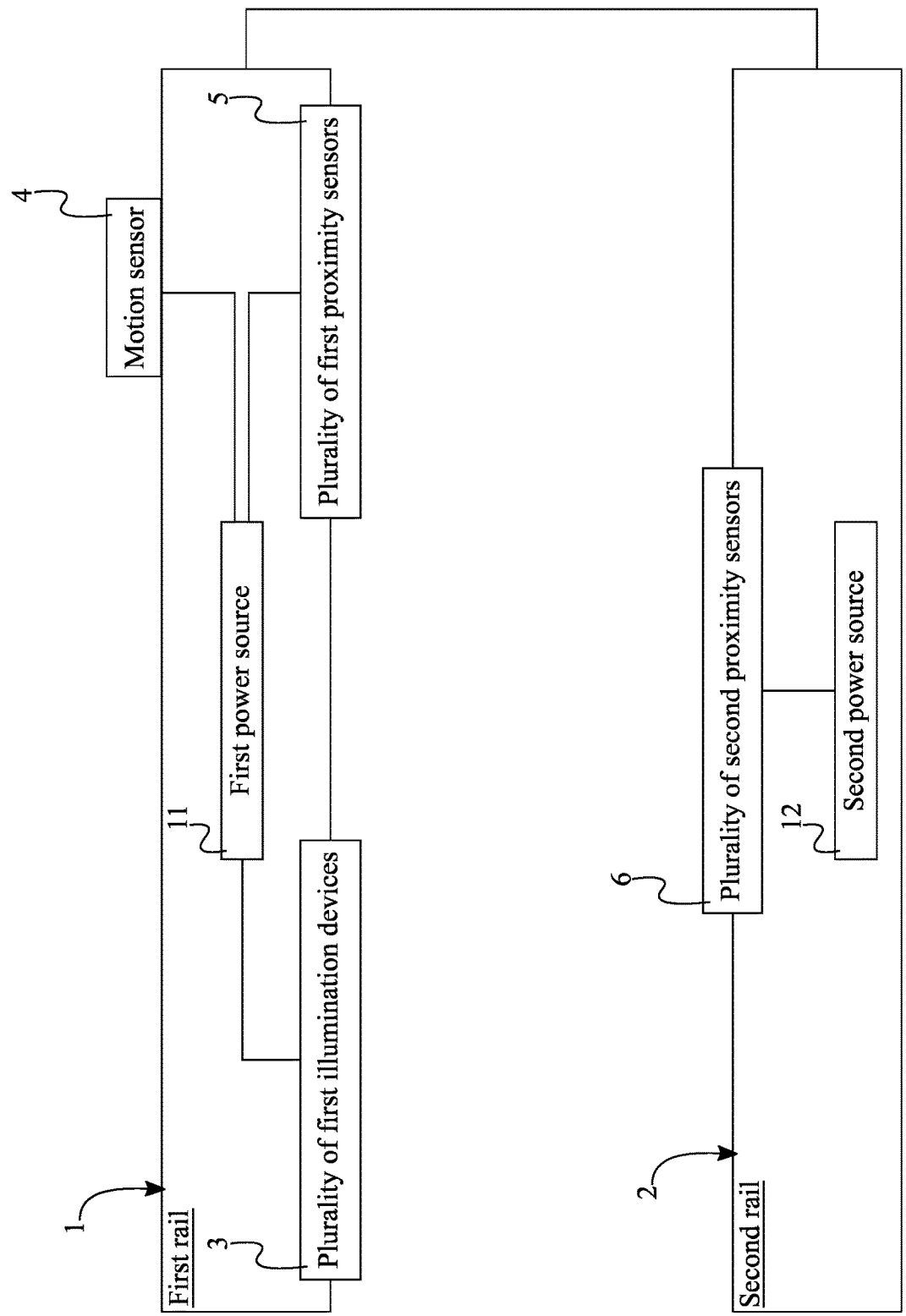
FIG. 9 is a schematic view of the electrical connections of the present invention with a first power source mounted within the first rail and a second power source mounted within the second rail.

In the preferred embodiment of the present invention, the plurality of first illumination devices 3 is evenly distributed along the first rail 1, seen in FIG. 1, FIG. 4, and FIG. 5. This arrangement allows the projected line to adjust along the first rail 1 as the different groups of items move along the conveyor belt 14. In order to determine the new position of the spaces between different groups of items, each of the plurality of first proximity sensors 5 is positioned adjacent to a corresponding illumination device from the plurality of first illumination devices 3.

Figure 3:
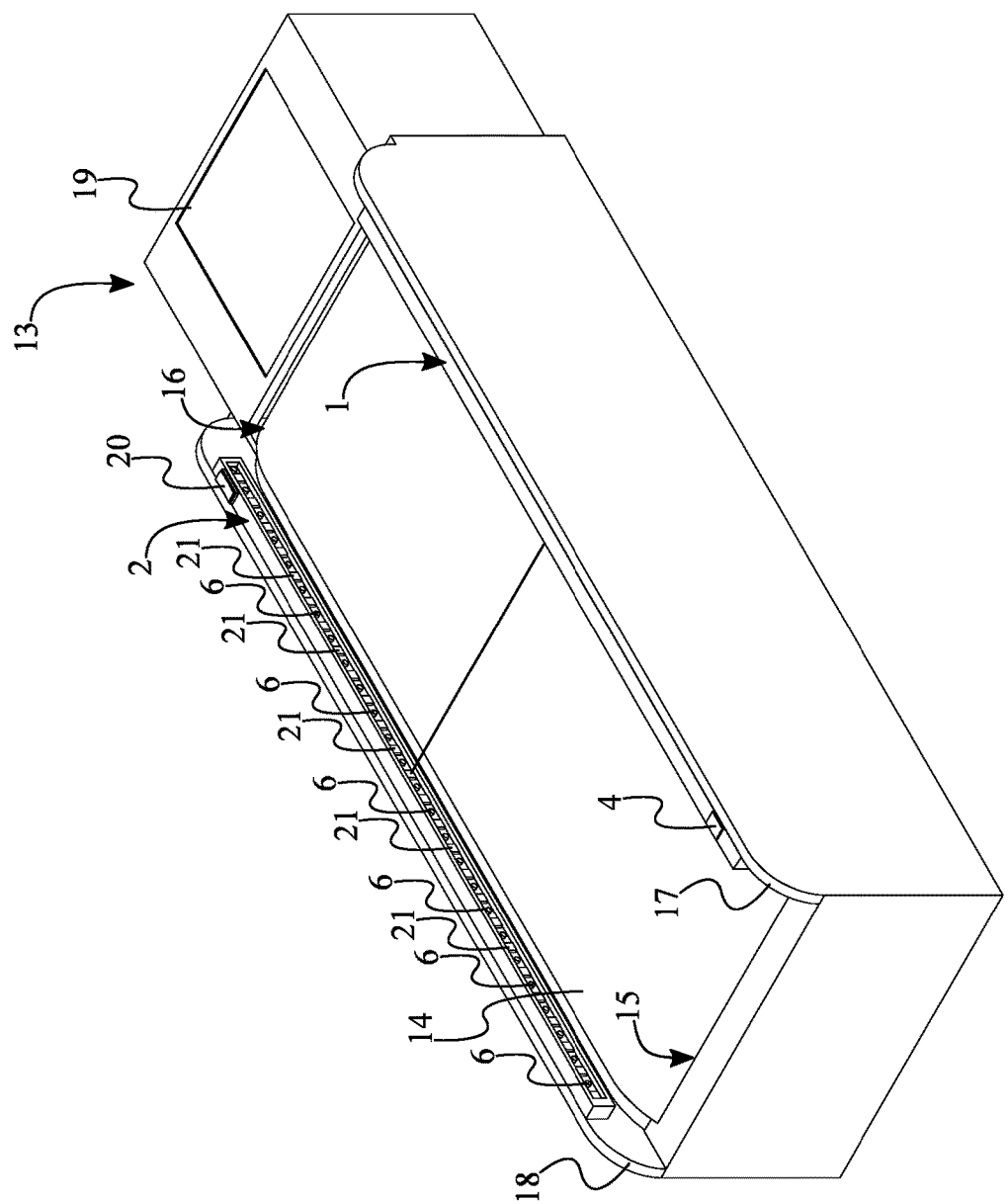
FIG. 3 is a rear perspective view of the present invention with the plurality of second proximity sensors and a plurality of second illumination devices along the second rail.

An alternate embodiment of the present invention further comprises a plurality of second illumination devices 21, seen in FIG. 3. The plurality of second illumination devices 21 aids the plurality of first illumination devices 3 to project a complete and definitive line from the first rail 1 to the second rail 2, wherein the line is between different groups of items. More specifically, multiple lines may be projected by adjacent illumination devices of the plurality of second illumination devices 21 in order to distinguish more than two groups of items with corresponding illumination devices of the plurality of first illumination devices 3. Similarly, the plurality of second illumination devices 21 is preferably an LED array. In order to provide a continuous line from the plurality of first illumination devices 3, the plurality of second illumination devices 21 is mounted along the second rail 2. Moreover, the plurality of second illumination devices 21 is oriented towards the first rail 1 in order to be able to delineate groups of items and the space between the different groups of items. It is understood that the plurality of second illumination devices 21, along with the plurality of second proximity sensors 6, is positioned adjacent to the second rail 2, opposite the second elongated barrier 18, with the checkout system 13, so that the second elongated barrier 18 does not inhibit the plurality of second illumination devices 21 and the plurality of second proximity sensors 6. In order for the plurality of second illumination devices 21 to be activated after upon the detection of a space by the plurality of second proximity sensors 6, the plurality of second illumination devices 21 is electronically connected with the at least one microcontroller 7. The at least one power source supplies power for the plurality of second illumination devices as well as the plurality of illumination devices 21 is electrically connected with the at least one power source 10.

Similar with the plurality of first illumination devices 3, the projected line is able to be adjusted along the second rail 2 as the different groups of items move along the conveyor belt 14 as the plurality of second illumination devices 21 is evenly distributed along the second rail 2, also seen in FIG. 3. Each of the plurality of second proximity sensors 6 is positioned adjacent to a corresponding illumination device from the plurality of second illumination devices 21 in order to determine the new position of the spaces between different groups of items.

In an embodiment of the present invention with the first rail 1 and the second rail 2 being directly connect by wires, the at least one microcontroller 7 and the at least one power source 10 are mounted within the first rail 1, seen in FIG. 1, FIG. 2, FIG. 3, FIG. 6, and FIG. 7. This arrangement provides a compact structure. The first rail 1 may completely conform along the first elongated barrier 17 as the electronic components are housed within the first rail 1.

In another embodiment of the present invention with the first rail 1 and the second rail 2 directly connected with wires, the present invention further comprises a controller box 22, seen in FIG. 4. The controller box 22 houses at least one microcontroller 7 and the at least one power source 10. In this embodiment, the first rail 1 may remain thinner in this embodiment as the controller box 22 is laterally connected with the first rail 1 while the at least one microcontroller 7 and the at least one power source 10 are externally positioned with the first rail 1. More specifically, the at least one microcontroller 7 and the at least one power source 10 are mounted within the controller box 22, effectively connecting the at least one microcontroller 7 and the at least one power source 10 with the first rail 1.

Figure 10:
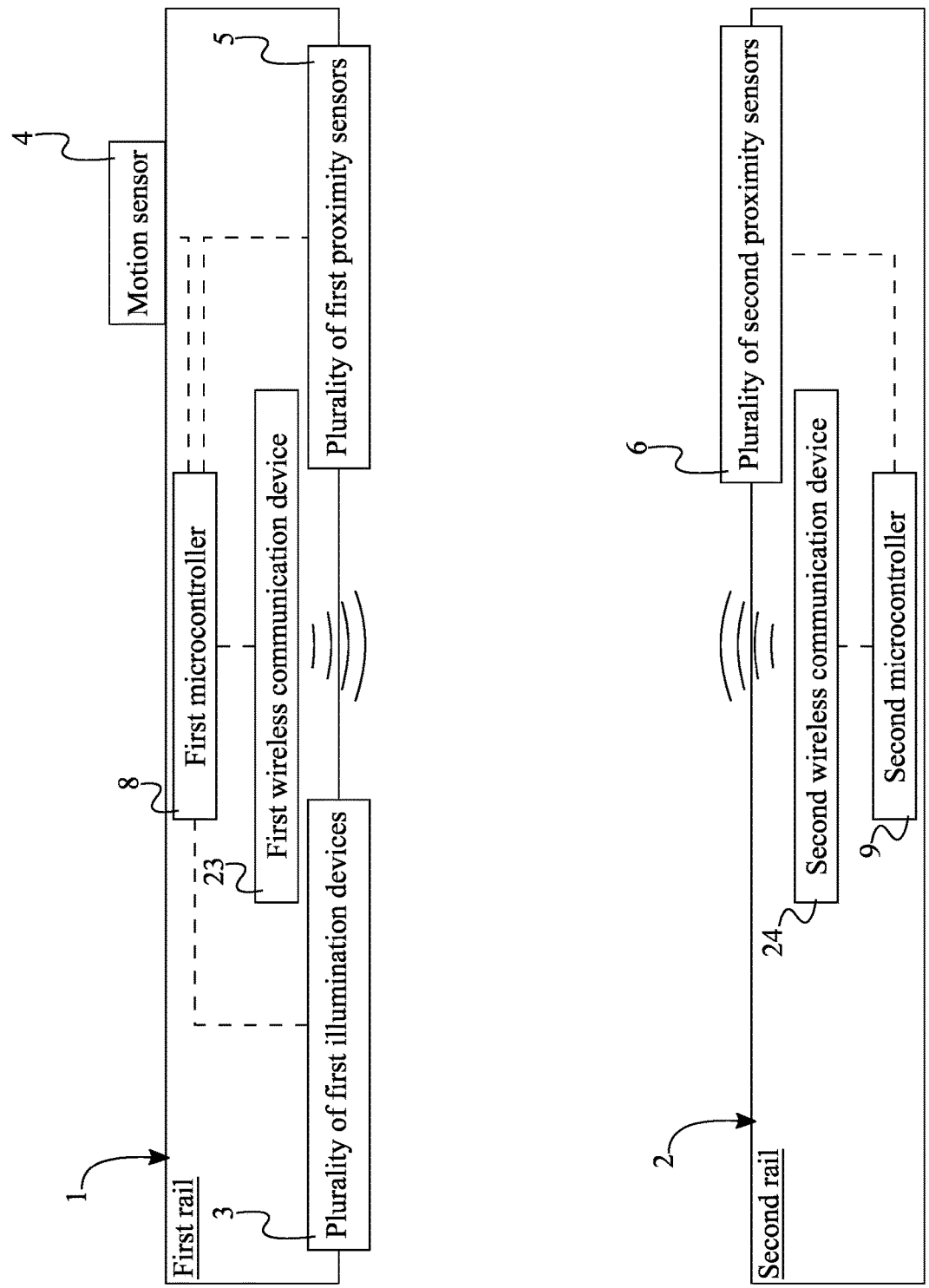
FIG. 10 is a schematic view of the electronic connections of the present invention with the first microcontroller and a first wireless communication device mounted within the first rail, and a second microcontroller and a second wireless communication device mounted within the second rail.
Figure 11:
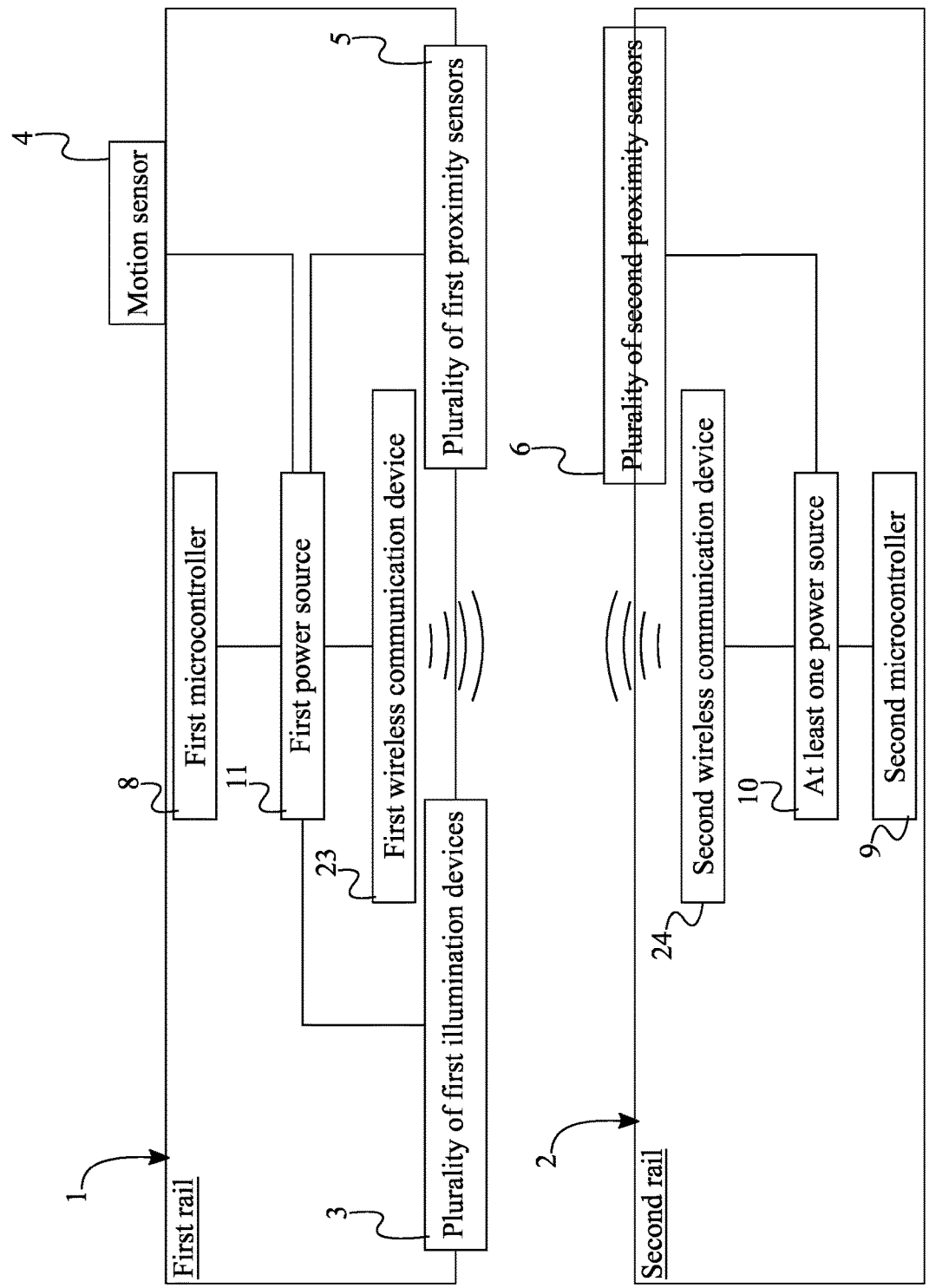
FIG. 11 is a schematic view of the electrical connections of the present invention with the first microcontroller and the first wireless communication device mounted within the first rail, and the second microcontroller and a second wireless communication device mounted within the second rail.

In another embodiment of the present invention the first rail 1 and the second rail 2 remain physically independent of one another as the present invention further comprises a first wireless communication device 23 and a second wireless communication device 24, seen in FIG. 10 and FIG. 11. The first wireless communication device 23 and the second wireless communication device 24 allows the plurality of first proximity sensors 5 and the plurality of second proximity sensors 6 simultaneously activate. Furthermore, the at least one microcontroller 7 may comprise a first microcontroller 8 and a second microcontroller 9 in order for the plurality of first proximity sensors 5 and the plurality of second proximity sensors 6 to remotely communicate with each other. In order for the electronic components that correspond to the first rail 1 and the second rail 2 to be independently supplied with power, the at least one power source 10 may comprise a first power source 11 and a second power source 12, respectively. The first microcontroller 8 communicates with the second microcontroller 9 as the first wireless communication device 23 is electronically connected with the first microcontroller 8. The first wireless communication device 23 and the first microcontroller 8 are electrically connected with the first power source 11, thereby providing power to the first wireless communication device 23 and the first microcontroller 8. Likewise, the second wireless communication device 24 is electronically connected with the second microcontroller 9 so that the second microcontroller 9 remotely communicates with the first microcontroller 8. The second wireless communication device 24 and the second microcontroller 9 are electrically connected with the second power source 12, thereby providing power to the second wireless communication device 24 and the second microcontroller 9. The first wireless communication device 23 is communicably coupled with the second wireless communication device 24 so that the first rail 1 and the second rail 2 may be independently mounted with the checkout system 13 while the plurality of first proximity sensors 5 and the plurality of second proximity sensors 6 simultaneously determine different groups of items along the conveyor belt 14.

Similar with the embodiment of the present invention wherein the first rail 1 and the second rail 2 are directly connected with wires, the first wireless communication device 23, the first microcontroller 8, and the first power source 11 are mounted within the first rail 1, also seen in FIG. 10 and FIG. 11. Moreover, the second microcontroller 9, and the second power source 12 are mounted within the second rail 2. This arrangement provides a compact structure for both the first rail 1 and the second rail 2. The first rail 1 and the second rail 2 may completely conform along the first elongated barrier 17 and the second elongated barrier 18 as the electronic components are housed within the first rail 1 and the second rail 2, respectively.

In further embodiments of the present invention with the first rail 1 and the second rail 2 remotely communicating with each other, the present invention may comprise a first controller box 25, seen in FIG. 5. The first controller box 25 houses the electronic components associated with the first rail 1, the first wireless communication device 23, the first microcontroller 8, and the first power source 11. The first rail 1 may remain thinner in this embodiment as the controller box 22 is laterally connected with the first rail 1 while the first wireless communication device 23, the first microcontroller 8, and the first power source 11 are mounted within the controller box 22. Moreover, the first wireless communication device 23, the first microcontroller 8, and the first power source 11 are externally positioned with the first rail 1. Likewise, the present invention may further comprise a second controller box 26, also seen in FIG. 5. The second controller box 26 houses the electronic components associated with the second rail 2, the second wireless communication device 24, the second microcontroller 9, and the second power source 12. The second rail 2 may remain thinner in this embodiment as the second controller box 26 is laterally connected with the second rail 2 while the second wireless communication device 24, the second microcontroller 9, and the second power source 12 are mounted within the controller box 22. Moreover, the second wireless communication device 24, the second microcontroller 9, and the second power source 12 are externally positioned with the second rail 2.

In further embodiments of the present invention, instead of the plurality of first proximity sensors 5, the plurality of second sensors 6, and the motion sensors 4, the present invention may comprise a camera. The camera in this embodiment of the present invention is a visual object detector that may be used to detect items and the respective position of the items in order to determine different groups of items. The camera is externally positioned with the first rail 1 and the second rail 2. The camera is preferably offset from the conveyor belt 14 such that the camera is able to detect items between the first rail 1 and the second rail 2. The camera is electronically connected with the at least one microcontroller 7 in order to process the images received by the camera and determine the spaces between groups of items. The plurality of first illumination devices 3 then activates and emits a line or multiple lines between the first rail 1 and the second rail 2.

Although the invention has been explained in relation to its preferred embodiment, it is to be understood that many other possible modifications and variations can be made without departing from the spirit and scope of the invention as hereinafter claimed.

What is claimed is:

1. A checkout conveyor system for visually separating items comprising:
   a first rail;
   a second rail;
   a plurality of first illumination devices;
   a motion sensor;
   a plurality of first proximity sensors;
   a plurality of second proximity sensors;
   at least one microcontroller;
   at least one power source;
   the first rail and the second rail being mounted parallel and offset from each other;
   the plurality of first illumination devices and the plurality of first proximity sensors being mounted along the first rail;
   the plurality of first illumination devices and the plurality of first proximity sensors being oriented towards the second rail;
   the plurality of second proximity sensors being mounted along the second rail;
   the plurality of second proximity sensors being oriented towards the first rail;
   the motion sensor being externally mounted to the first rail;
   the plurality of first illumination devices, the motion sensor, the plurality of first proximity sensors, the plurality of second proximity sensors, and the at least one power source being electronically connected with the at least one microcontroller; and,
   the plurality of first illumination devices, the motion sensor, the plurality of first proximity sensors, and the plurality of second proximity sensors being electrically connected with the at least one power source.

2. The checkout conveyor system for visually separating items as claimed in claim 1 comprising:
   a checkout system;
   the checkout system comprising a conveyor belt, a first elongated barrier, and a second elongated barrier;
   the first elongated barrier and the second elongated barrier being positioned parallel and offset from each other;
   the conveyor belt being mounted in between the first elongated barrier and the second elongated barrier;
   the first rail and the second rail being positioned in between the first elongated barrier and the second elongated barrier;
   the first rail and the second rail being positioned adjacent to the conveyor belt;
   the first rail being connected adjacent and along the first elongated barrier;
   the plurality of first illumination devices and the plurality of first proximity sensors being positioned adjacent to the first rail, opposite the first elongated barrier; and,
   the second rail being connected adjacent and along the second elongated barrier.

3. The checkout conveyor system for visually separating items as claimed in claim 2 comprising:
   a reset button;
   the checkout system further comprising a scanner;
   the conveyor belt comprising an input end and an output end;
   the scanner being mounted adjacent with the output end;
   the motion sensor being positioned adjacent with the input end;
   the motion sensor being mounted adjacent to the first rail, opposite the conveyor belt;
   the reset button being positioned adjacent with the output end;
   the reset button being mounted onto the second rail, opposite the conveyor belt; and,
   the reset button being electronically connected to the at least one microcontroller.

4. The checkout conveyor system for visually separating items as claimed in claim 1 comprising:
the plurality of first illumination devices being evenly distributed along the first rail; and,
each of the plurality of first proximity sensors being positioned adjacent to a corresponding illumination device from the plurality of first illumination devices.

5. The checkout conveyor system for visually separating items as claimed in claim 1, wherein the plurality of first illumination devices is a light emitting diode (LED) array.

6. The checkout conveyor system for visually separating items as claimed in claim 1 comprising:
a plurality of second illumination devices;
the plurality of second illumination devices being mounted along the second rail;
the plurality of second illumination devices being oriented towards the first rail;
the plurality of second illumination devices being electronically connected with the at least one microcontroller; and,
the plurality of second illumination devices being electrically connected with the at least one power source.

7. The checkout conveyor system for visually separating items as claimed in claim 6 comprising:
the plurality of second illumination devices being evenly distributed along the second rail; and,
each of the plurality of second proximity sensors being positioned adjacent to a corresponding illumination device from the plurality of second illumination devices.

8. The checkout conveyor system for visually separating items as claimed in claim 6, wherein each of the plurality of second illumination devices is an LED array.

9. The checkout conveyor system for visually separating items as claimed in claim 1 comprising:
the at least one microcontroller and the at least one power source being mounted within the first rail.

10. The checkout conveyor system for visually separating items as claimed in claim 1 comprising:
a controller box;
the controller box being laterally connected with the first rail; and,
the at least one microcontroller and the at least one power source being mounted within the controller box.

11. The checkout conveyor system for visually separating items as claimed in claim 1 comprising:
a first wireless communication device;
a second wireless communication device;
the at least one microcontroller comprising a first microcontroller and a second microcontroller;
the at least one power source comprising a first power source and a second power source;
the first wireless communication device being electronically connected with the first microcontroller;
the first wireless communication device and the first microcontroller being electrically connected with the first power source;
the second wireless communication device being electronically connected with the second microcontroller;
the second wireless communication device and the second microcontroller being electrically connected with the second power source; and,
the first wireless communication device being communicably coupled with the second wireless communication device.

12. The checkout conveyor system for visually separating items as claimed in claim 11 comprising:
the first wireless communication device, the first microcontroller, and the first power source being mounted within the first rail.

13. The checkout conveyor system for visually separating items as claimed in claim 11 comprising:
the second wireless communication device, the second microcontroller, and the second power source being mounted within the second rail.

14. The checkout conveyor system for visually separating items as claimed in claim 11 comprising:
a first controller box;
the first controller box being laterally connected with the first rail; and,
the first wireless communication device, the first microcontroller, and the first power source being mounted within the controller box.

15. The checkout conveyor system for visually separating items as claimed in claim 11 comprising:
a second controller box;
the second controller box being laterally connected with the second rail; and,
the second wireless communication device, the second microcontroller, and the second power source being mounted within the controller box.

* * * * *